(12) United States Patent
Ishikawa et al.

(10) Patent No.: US 9,663,652 B2
(45) Date of Patent: May 30, 2017

(54) POLYBUTYLENE TEREPHTHALATE RESIN COMPOSITION

(71) Applicant: WinTech Polymer Ltd., Tokyo (JP)

(72) Inventors: Takuma Ishikawa, Fuji (JP); Takayuki Ishikawa, Fuji (JP); Kazuya Goshima, Fuji (JP)

(73) Assignee: WinTech Polymer Ltd., Tokyo (JP)

( * ) Notice: Subject to any disclaimer, the term of this patent is extended or adjusted under 35 U.S.C. 154(b) by 0 days.

(21) Appl. No.: 15/115,404

(22) PCT Filed: Jan. 27, 2015

(86) PCT No.: PCT/JP2015/052197
§ 371 (c)(1),
(2) Date: Jul. 29, 2016

(87) PCT Pub. No.: WO2015/115425
PCT Pub. Date: Aug. 6, 2015

(65) Prior Publication Data
US 2017/0002194 A1    Jan. 5, 2017

(30) Foreign Application Priority Data

Jan. 31, 2014  (JP) ................................ 2014-016520

(51) Int. Cl.
*C08G 63/02*    (2006.01)
*C08L 67/02*    (2006.01)

(52) U.S. Cl.
CPC .......... *C08L 67/02* (2013.01); *C08L 2201/08* (2013.01); *C08L 2205/06* (2013.01)

(58) Field of Classification Search
USPC .......................... 524/311, 317, 414; 525/419
See application file for complete search history.

(56) References Cited

U.S. PATENT DOCUMENTS 5,043,371 A    8/1991    Nakano et al.

FOREIGN PATENT DOCUMENTS

| CN | 103232685 A | 8/2013 |
|---|---|---|
| JP | 1-223157 A | 9/1989 |
| JP | 4-120162 A | 4/1992 |
| JP | 5-17669 A | 1/1993 |
| JP | 8-169998 A | 7/1996 |
| JP | 11-322949 A | 11/1999 |
| JP | 2001-302897 A | 10/2001 |
| JP | 2008-222995 A | 9/2008 |
| WO | 2011/111547 A1 | 9/2011 |

OTHER PUBLICATIONS

International Search Report dated Feb. 24, 2015, issued in counterpart International Application No. PCT/JP2015/052197 (2 pages).
Decision to Grant a Patent dated Jul. 21, 2015, issued in counterpart Japanese Patent Application No. 2015-513913, w/English translation (6 pages).
Notification of Reasons for Refusal dated Apr. 23, 2015, issued in counterpart Japanese Patent Application No. 2015-513913, w/English translation (6 pages).
Office Action dated Dec. 1, 2016, issued in counterpart Chinese Patent Application No. 201580005741.1, with partial English translation. (6 pages).

*Primary Examiner* — Terressa Boykin
(74) *Attorney, Agent, or Firm* — Westerman, Hattori, Daniels & Adrian, LLP

(57) ABSTRACT

Provided is a polybutylene terephthalate resin composition having excellent mold releasability, measurement stability and hydrolysis resistance, and exhibiting minimal discoloration under high-temperature conditions. The polybutylene terephthalate resin composition contains: (A) a polybutylene terephthalate resin, (B) a higher fatty acid ester of pentaerythritol, and (C) a low-molecular weight polyethylene having a number-average molecular weight of 3,000 to 7,000. It is preferable that the component (B) is pentaerythritol tetrastearate, and that the component (C) is a low-molecular weight polyethylene having a number-average molecular weight of 4,500 to 5,500.

5 Claims, 1 Drawing Sheet

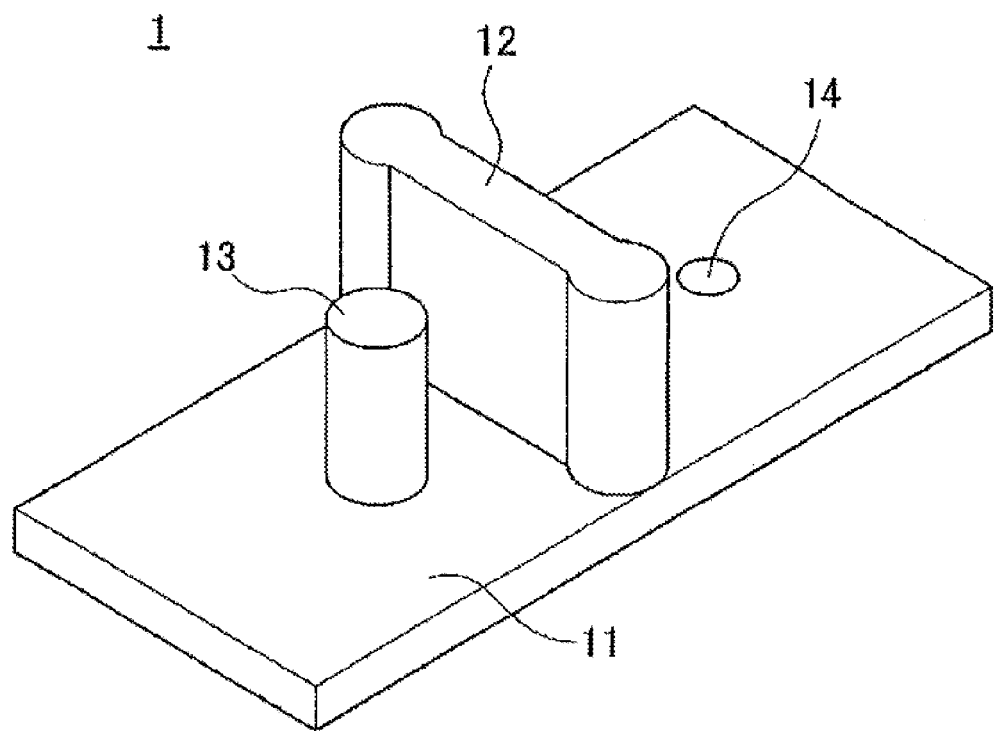

POLYBUTYLENE TEREPHTHALATE RESIN COMPOSITION

TECHNICAL FIELD

The present invention relates to a polybutylene terephthalate resin composition, and more specifically, relates to a polybutylene terephthalate resin composition excellent in, in particular, mold releasability and measurement stability during injection molding.

BACKGROUND ART

Polybutylene terephthalate resins (hereafter also referred to as "PBT resins") have a high heat distortion temperature and exhibit excellent electrical properties, mechanical properties, weather resistance and chemical resistance and the like, and are consequently widely used as engineering plastics in a variety of applications, including electrical and electronic components, and vehicle components and the like.

Because PBT resins are thermoplastic resins, an injection molding method is generally used to obtain molded articles of the resin. An injection molding method is a method in which the melted resin composition is poured into the cavity of a mold that has been heated to a temperature no higher than the softening temperature of the resin, thereby solidifying the resin and molding the resin into the shape of the mold cavity. Following molding, the molded article is released from the mold, but if the molded article and the mold are stuck strongly together, then mold release can prove difficult, and the molded article can sometimes be destroyed or damaged during the release process. Accordingly, in injection molding methods, improving the mold releasability is extremely important. In order to improve the mold releasability, additives such as mold release agents and lubricants are typically added to the resin composition (for example, see Patent Documents 1 to 3).

On the other hand, in one example of an injection molding method, by pelletizing a resin composition containing the PBT resin and a lubricant, and feeding the resulting pellets into a hopper on the injection molding machine, the pellets pass through a cylinder supply unit, a plasticization unit and a measuring unit, and are then injected from a nozzle into the cavity of the mold. In this case, if the transport of the pellets through the supply unit or the melting of the pellets in the plasticization unit becomes unstable for some reason, then a problem arises in that fluctuations occur in the time required to measure the amount of resin required for a single shot in the measuring unit.

Patent Document 1 discloses a polyester resin composition comprising a thermoplastic polyester resin and a fatty acid ester. This resin composition enables improvements in the mold releasability and the measurement stability and the like. For the fatty acid ester, a compound obtained from a polyhydric alcohol selected from among glycerol and pentaerythritol, and a fatty acid having a carbon number of 12 or greater is used. However, when a fatty acid ester having a small hydroxyl value (for example, pentaerythritol tetraerythritol) is used as a simple substance, the measurement stability tends to deteriorate. Further, because the PBT resin has ester groups within the molecule, it has another shortcoming in that under conditions of high temperature and high humidity, a deterioration in the physical properties tends to occur due to hydrolysis. As a result, improvements are required in the hydrolysis resistance, but the hydrolysis resistance of the above resin composition cannot be said to be totally satisfactory.

Patent Document 2 discloses a styrene-based resin composition comprising: (a) a styrene-based resin, (b) a higher fatty acid ester or the like of pentaerythritol, (c) ethylenebisstearylamide, and (d) a low-molecular weight polyethylene. This resin composition enables an improvement in the mold releasability, but improvements in the measurement stability were not pursued.

Patent Document 3 discloses a resin composition comprising a specific polyester resin containing a PBT resin, and at least one lubricant selected from among specific phosphate esters, montan wax and polyethylene wax. This resin composition enables improvements in the mold releasability, the plate-out characteristics, and the calendering processability such as the drawdown characteristics. However, investigations by the inventors of the present invention revealed that the resin composition suffered from discoloration under high-temperature conditions.

PRIOR ART DOCUMENTS

Patent Documents

Patent Document 1: JP H04-120162 A
Patent Document 2: JP H08-169998 A
Patent Document 3: JP 2008-222995 A

SUMMARY OF INVENTION

Technical Problem

The present invention has been made in light of the conventional problems described above, and has an object of providing a polybutylene terephthalate resin composition having excellent mold releasability, measurement stability and hydrolysis resistance, and exhibiting minimal discoloration under high-temperature conditions.

Solution to Problem

In order to achieve the above object, the present invention is as follows.

(1) A polybutylene terephthalate resin composition comprising: (A) a polybutylene terephthalate resin, (B) a higher fatty acid ester of pentaerythritol, and (C) a low-molecular weight polyethylene having a number-average molecular weight of 3,000 to 7,000.
(2) The polybutylene terephthalate resin composition according to (1) above, wherein the component (B) is a stearate ester of pentaerythritol.
(3) The polybutylene terephthalate resin composition according to (1) or (2) above, wherein the component (8) is pentaerythritol tetrastearate.
(4) The polybutylene terephthalate resin composition according to any one of (1) to (3) above, wherein the component (C) is a low-molecular weight polyethylene having a number-average molecular weight of 4,500 to 5,500.
(5) The polybutylene terephthalate resin composition according to any one of (1) to (4) above, wherein the component (C) is a linear polyethylene.
(6) The polybutylene terephthalate resin composition according to any one of (1) to (5) above, comprising 0.01 to 2.0 parts by mass of the component (B) and 0.1 to 5.0 parts by mass of the component (C) per 100 parts by mass of the component (A).

Advantageous Effects of Invention

According to the present invention, it is possible to provide a polybutylene terephthalate resin composition having excellent mold releasability, measurement stability and hydrolysis resistance, and exhibiting minimal discoloration under high-temperature conditions.

BRIEF DESCRIPTION OF DRAWINGS

FIG. 1 is a perspective view illustrating a test piece used in evaluating the mold releasability in the examples.

EMBODIMENTS FOR CARRYING OUT THE INVENTION

The polybutylene terephthalate resin composition of the present invention comprises: (A) a polybutylene terephthalate resin, (B) a higher fatty acid ester of pentaerythritol, and (C) a low-molecular weight polyethylene having a number-average molecular weight of 3,000 to 7,000.

In the PBT resin composition of the present invention, the component (B) and the component (C) function as lubricants, and by using this combination of lubricants, not only excellent mold releasability, but also excellent measurement stability and hydrolysis resistance can be obtained, and the occurrence of discoloration can also be suppressed.

Each of the components of the PBT resin composition of the present invention is described below.

(A) PBT Resin

The PBT resin is a resin obtained by polycondensation of a dicarboxylic acid component containing at least terephthalic acid or an ester-forming derivative thereof (such as a $C_1$ to $C_6$ alkyl ester or acid halide), and a glycol component containing at least an alkylene glycol having a carbon number of 4 (1,4-butanediol) or an ester-forming derivative thereof (such as an acetylated derivative). The PBT resin is not limited to homo-polybutylene terephthalate, and may be a copolymer containing at least 60 mol % (and particularly at least 75 mol % but not more than 95 mol %) of butylene terephthalate units.

There are no particular limitations on the amount of terminal carboxyl groups in the PBT resin, provided the effects of the present invention are not impaired. The amount of terminal carboxyl groups in the PBT resin is preferably not more than 30 meq/kg, and is more preferably 25 meq/kg or less.

The intrinsic viscosity (IV) of the PBT resin is preferably from 0.70 to 1.00 dL/g, more preferably from 0.72 to 0.95 dL/g, and even more preferably from 0.75 to 0.90 dL/g. When a PBT resin having an intrinsic viscosity within this range is used, the resulting PBT resin composition exhibits particularly superior flame retardancy and fluidity. In contrast, if the intrinsic viscosity is less than 0.70 dL/g, then excellent flame retardancy is unobtainable, whereas if the intrinsic viscosity exceeds 1.00 dL/g, then excellent fluidity is unobtainable.

A PBT resin having an intrinsic viscosity within the above range can also be prepared by blending PBT resins having different intrinsic viscosities to adjust the overall intrinsic viscosity. For example, a PBT resin having an intrinsic viscosity of 0.9 dL/g and a PBT resin having an intrinsic viscosity of 0.7 dL/g can be blended together to prepare a PBT resin having an intrinsic viscosity of 0.8 dL/g. The intrinsic viscosity (IV) of the PBT resin can be measured, for example, in o-chlorophenol at a temperature of 35° C.

In the PBT resin, examples of dicarboxylic acid components other than the terephthalic acid or an ester-forming derivative thereof (namely, comonomer components) include $C_8$ to $C_{14}$ aromatic dicarboxylic acids such as isophthalic acid, phthalic acid, 2,6-naphthalene dicarboxylic acid and 4,4'-dicarboxydiphenyl ether; $C_4$ to $C_{16}$ alkane dicarboxylic acids such as succinic acid, adipic acid, azelaic acid and sebacic acid; $C_5$ to $C_{10}$ cycloalkane dicarboxylic acids such as cyclohexane dicarboxylic acid; and ester-forming derivatives (such as $C_1$ to $C_6$ alkyl ester derivatives and acid halides) of these dicarboxylic acid components. These dicarboxylic acid components may be used individually, or combinations of two or more components may be used.

Among these dicarboxylic acid components, $C_8$ to $C_{12}$ aromatic dicarboxylic acids such as isophthalic acid and $C_6$ to $C_{12}$ alkane dicarboxylic acids such as adipic acid, azelaic acid and sebacic acid are particularly preferable.

In the PBT resin, examples of glycol components other than the 1,4-butanediol (namely, comonomer components) include $C_2$ to $C_{10}$ alkylene glycols such as ethylene glycol, propylene glycol, trimethylene glycol, 1,3-butylene glycol, hexamethylene glycol, neopentyl glycol and 1,3-octanediol; polyoxyalkylene glycols such as diethylene glycol, triethylene glycol and dipropylene glycol; alicyclic dials such as cyclohexanedimethanol and hydrogenated bisphenol A; aromatic diols such as bisphenol A and 4,4'-dihydroxybiphenyl; $C_2$ to $C_4$ alkylene oxide adducts of bisphenol A such as ethylene oxide 2-mol adducts of bisphenol A and propylene oxide 3-mol adducts of bisphenol A; and ester-forming derivatives (such as acetylated derivatives) of these glycols. These glycol components may be used individually, or combinations of two or more components may be used.

Among these glycol components, $C_2$ to $C_6$ alkylene glycols such as ethylene glycol and trimethylene glycol, polyoxyalkylene glycols such as diethylene glycol, and alicyclic diols such as cyclohexanedimethanol and the like are particularly preferable.

Examples of comonomer components that may be used besides the dicarboxylic acid component and the glycol component include aromatic hydroxycarboxylic acids such as 4-hydroxybenzoic acid, 3-hydroxybenzoic acid, 6-hydroxy-2-naphthoic acid and 4-carboxy-4'-hydroxybiphenyl; aliphatic hydroxycarboxylic acids such as glycolic acid and hydroxycaproic acid; $C_3$ to $C_{12}$ lactones such as propiolactone, butyrolactone, valerolactone and caprolactones (such as ε-caprolactone); and ester-forming derivatives (such as $C_1$ to $C_6$ alkyl ester derivatives, acid halides and acetylated derivatives) of these comonomer components.

In the present invention, as outlined above, a PBT resin is mentioned as a resin component. However, any of other polyester resins such as PET resins, PPT resins, PBN resins and PEN resins may also be used.

(B) Higher Fatty Acid Ester of Pentaerythritol

As mentioned above, the pentaerythritol higher fatty acid ester (B) functions as a lubricant. Examples of the higher fatty acid that gives rise to the component (B) include fatty acids having a carbon number of 6 to 28, and specific examples include oleic acid, stearic acid, lauric acid, hydroxystearic acid, behenic acid, arachidonic acid, linoleic acid, linolenic acid, ricinoleic acid, palmitic acid and montanoic acid. Among these, stearic acid, palmitic acid and behenic acid are preferable.

From the viewpoint of enabling suppression of discoloration under high-temperature conditions, the component (B) is preferably a stearate ester of pentaerythritol.

Further, among the various stearate esters of pentaerythritol, from the viewpoint of improving the mold releasability, the full ester is preferable to the partial esters. In other words, pentaerythritol tetrastearate is preferred.

In the present invention, the amount of the component (B) is preferably from 0.01 to 2.0 parts by mass, and more preferably from 0.1 to 1.0 parts by mass, per 100 parts by mass of the component (A).

(C) Low-Molecular Weight Polyethylene Having Number-Average Molecular Weight of 3,000 to 7,000

Similarly to the component (B), the low-molecular weight polyethylene having a number-average molecular weight of 3,000 to 7,000 functions as a lubricant. Specifically, by combining the component (B) and the component (C), the effects of the present invention described above can be achieved.

In the present invention, the number-average molecular weight of the low-molecular weight polyethylene of the component (C) is from 3,000 to 7,000, because at values less than 3,000 the measurement stability deteriorates, whereas at values exceeding 7,000 the mold releasability deteriorates. The number-average molecular weight is preferably from 4,000 to 6,000, and more preferably from 4,500 to 5,500.

From the viewpoints of improving the thermal stability, strength and mold releasability, the molecular form of the low-molecular weight polyethylene of the component (C) is preferably close to a linear form with an appropriate degree of branching. If the amount of branching is too little, then there is a possibility of bleeding or a reduction in strength, whereas if the amount of branching is too much, then the improvement in the mold releasability may be minimal.

In the present invention, the amount of the component (C) is preferably from 0.1 to 5.0 parts by mass, and more preferably from 0.2 to 3.0 parts by mass, per 100 parts by mass of the component (A).

Further, in the present invention, the content ratio (y/x) between the component (B) (x) and the component (C) (y) is preferably from 0.5 to 50.0, more preferably from 1.0 to 20.0, and even more preferably from 1.5 to 10.

Other Components

The PBT resin composition of the present invention may also include other components, provided they do not impair the effects of the present invention. Examples of these other components include inorganic fillers, anti-dripping agents, antioxidants such as hindered phenols, phosphorus-based secondary antioxidants, thioether-based secondary antioxidants, inorganic nucleating agents and colorants.

EXAMPLES

The present invention is described below in further detail using a series of examples, but the present invention is in no way limited by the following examples.

Examples 1 to 4, Comparative Examples 1 to 11

In each example and each comparative example, the number of parts (parts by mass) of the PET resin and the other components shown below in Table 1 were blended together, and the resulting mixture was subjected to melt-kneading at 260° C. and extrusion using a twin screw extruder having screws of 30 mmϕ (TEX-30 manufactured by The Japan Steel Works, Ltd.), thus obtaining resin pellets.

Details of each of the above components are as follows.
PET resin: DURANEX (a registered trademark), manufactured by WinTech Polymer Ltd. (intrinsic viscosity: 0.84 dL/g, amount of terminal carboxyl groups: 14 meq/kg)
Pentaerythritol tetrastearate: Rikester EW-440AT, manufactured by Riken Vitamin Co., Ltd.
Trimethylolpropane montanoate: Licolub WE40, manufactured by Clariant Japan K.K.
Glycerol tristearate: Poem S-95, manufactured by Riken Vitamin Co., Ltd.
Polyethylene 1 (number-average molecular weight: 5,000, melting point: 105° C.)
Polyethylene 2 (number-average molecular weight: 600, melting point: 59° C.)
Polyethylene 3 (number-average molecular weight: 700, melting point: 72° C.)
Polyethylene 4 (number-average molecular weight: 1,500, melting point: 102° C.)
Polyethylene 5 (number-average molecular weight: 2,000, melting point: 102° C.)
Polyethylene 6 (number-average molecular weight: 8,000, melting point: 127° C.)

Using the resin pellets obtained in each of the examples and comparative examples in the manner described above, the tests (1) to (4) described below were performed. However, in the case of Examples 2 to 4 and Comparative Examples 5, 7 to 9 and 11, only the evaluation of measurement stability (2) was performed. Further, in Comparative Examples 3 and 4, the evaluation of discoloration (3) was not performed. Moreover, in Comparative Example 10, only the evaluations (1) to (3) were performed.

(1) Mold Releasability

The resin pellets of each of the examples and comparative examples were dried at 140° C. for 3 hours, and the mold releasability was then evaluated. Evaluation of the mold releasability was performed using a test piece 1 illustrated in FIG. 1, composed of a flat plate 11, a rib-shaped first mold release resistance section 12 and a circular cylindrically shaped second mold release resistance section 13, by molding the test piece 1 in an injection molding machine (EC40, manufactured by Toshiba Corporation) under conditions including a cylinder temperature of 250° C., a mold temperature of 40° C., an injection rate of 20 mm/sec, and a holding pressure of 70 MPa, and then measuring the minimum cooling time (seconds) that enables the test pieces from three consecutive shots to be ejected, by striking an ejection point 14 on the flat plate 11 with an ejector pin, with no deformation of the test pieces. The results are shown in Table 1. The dimensions of the flat plate 11 were long side: 30 mm, short side: 15 mm, and thickness: 1 mm, the dimensions of the first mold release resistance section 12 were height: 10 mm, width: 15 mm, central wall thickness: 2 mm, and end wall thickness: 3 mm, and the dimensions of the second mold release resistance section 13 were base diameter: 3 mm and height: 7 mm.

(2) Measurement Stability

The resin pellets of each of the examples and comparative examples, obtained in the manner described above, were loaded into an injection molding machine (EC40, manufactured by Toshiba Corporation), continuous molding of a flat plate of 65 mm×55 mm×2 mm was performed, and the measurement time per shot was measured across 200 shots. In order to exclude the effects of any initial instability, the first 20 shots were discarded and the 200 shots following the first 20 shots were measured. The average measurement time and the number of shots for which the single shot measurement time exceeded 100 seconds were determined. The results are shown in Table 1.

(3) Discoloration

The resin pellets of each of the examples and comparative examples, obtained in the manner described above, were loaded into an injection molding machine (EC40, manufactured by Toshiba Corporation), a strip-shaped test piece of 130 mm×13 mm×1.5 mm was molded, and a drying treatment was performed at 150° C. in a gear oven. Using a test piece prior to the drying treatment and a test piece that had been treated for 300 hours, the color difference ΔE between the test pieces was measured using a spectrocolorimeter (SE6000, manufactured by Nippon Denshoku Industries Co., Ltd.). The results are shown in Table 1.

(4) Hydrolysis Resistance

The resin pellets of each of the examples and comparative examples, obtained in the manner described above, were loaded into an injection molding machine (EC40, manufactured by Toshiba Corporation), a strip-shaped test piece of 130 mm×13 mm×1.5 mm was molded, and an initial value for the flexural strength (MPa) was measured using a universal tester (RTC-1325A, manufactured by Orientec Co., Ltd.). Subsequently, a pressure cooker test (PCT) apparatus was used to perform a treatment for 50 hours under conditions of 121° C. and 100% RH, the flexural strength (MPa) was then remeasured using the same measurement method as above, and a retention rate was determined from the measured value and the initial value. The initial flexural strength, the flexural strength following the PCT treatment, and the retention rate are shown in Table 1.

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| | PBT resin | 100 | 100 | 100 | 100 | 100 | 100 | 100 | 100 |
| | Pentaerythritol tetrastearate | 0.2 | 0.2 | 0.3 | 0.5 | 0.2 | 0.3 | 0.2 | 0.2 |
| | Trimethylolpropane montanoate | — | — | — | — | — | — | — | — |
| | Glycerol tristearate | — | — | — | — | — | — | — | — |
| | Polyethylene 1 (number-average molecular weight: 5000) | 0.5 | 1.0 | 1.0 | 2.0 | — | — | — | — |
| | Polyethylene 2 (number-average molecular weight: 600) | — | — | — | — | — | — | 0.5 | — |
| | Polyethylene 3 (number-average molecular weight: 700) | — | — | — | — | — | — | — | 0.5 |
| | Polyethylene 4 (number-average molecular weight: 1500) | — | — | — | — | — | — | — | — |
| | Polyethylene 5 (number-average molecular weight: 2000) | — | — | — | — | — | — | — | — |
| | Polyethylene 6 (number-average molecular weight: 8000) | — | — | — | — | — | — | — | — |
| Mold releasability | Minimum cooling time that enables ejection (seconds) | 24 | — | — | 12 | >40 | >40 | 4 | 4 |
| Measurement stability | Average measurement time (seconds) | 12 | 11 | 12 | 15 | 17 | 18 | 22 | 14 |
| | Number of shots for which measurement time exceeded 100 seconds (number) | 0 | 0 | 0 | 0 | 4 | 6 | 8 | 5 |
| Discoloration | ΔE after 150° C. × 300 hr | 5.1 | — | — | — | 5.9 | 6.3 | — | — |
| Hydrolysis resistance | Initial Flexural strength (MPa) | 78 | — | — | — | 80 | 80 | 78 | 78 |
| | Flexural strength after PCT 50 hr (MPa) | 71 | — | — | — | 74 | 75 | 66 | 69 |
| | Retention rate (%) | 91 | — | — | — | 92 | 94 | 84 | 88 |

| | | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|
| | PBT resin | 100 | 100 | 100 | 100 | 100 | 100 | 100 |
| | Pentaerythritol tetrastearate | 0.2 | — | 0.2 | 0.2 | — | — | — |
| | Trimethylolpropane montanoate | — | 0.4 | — | — | — | 0.3 | — |
| | Glycerol tristearate | — | — | — | — | — | — | 0.3 |
| | Polyethylene 1 (number-average molecular weight: 5000) | — | — | — | — | 1.0 | 1.0 | 1.0 |
| | Polyethylene 2 (number-average molecular weight: 600) | — | — | — | — | — | — | — |
| | Polyethylene 3 (number-average molecular weight: 700) | — | — | — | — | — | — | — |
| | Polyethylene 4 (number-average molecular weight: 1500) | 1.0 | — | — | — | — | — | — |
| | Polyethylene 5 (number-average molecular weight: 2000) | — | — | 1.0 | — | — | — | — |
| | Polyethylene 6 (number-average molecular weight: 8000) | — | — | — | 1.0 | — | — | — |
| Mold releasability | Minimum cooling time that enables ejection (seconds) | — | 22 | — | 30 | >40 | 16 | >40 |
| Measurement stability | Average measurement time (seconds) | >100 | 12 | >100 | 14 | 11 | 12 | 14 |
| | Number of shots for which measurement time exceeded 100 seconds (number) | * | 0 | * | 1 | 0 | 0 | 2 |
| Discoloration | ΔE after 150° C. × 300 hr | — | 10 | — | — | — | 10 | — |
| Hydrolysis resistance | Initial Flexural strength (MPa) | — | 78 | — | — | — | — | — |
| | Flexural strength after PCT 50 hr (MPa) | — | 77 | — | — | — | — | — |
| | Retention rate (%) | — | 99 | — | — | — | — | — |

* Because the measurement time was longer than 100 seconds for all shots, molding was impossible.

From Table 1 above, it is evident that in Example 1, good results were obtained for all of the mold releasability, the measurement stability and the hydrolysis resistance. Further, based on a comparison of Example 2 and Comparative Example 5, which differ only in terms of the number-average molecular weight of the polyethylene, and otherwise have the same composition, and a comparison of Example 3 and Comparative Example 2, which differ only in terms of the presence or absence of the polyethylene, and otherwise have the same composition, it is evident that by using a polyethylene having a number-average molecular weight within the range prescribed in the present invention, the measurement stability can be improved.

On the other hand, Comparative Examples 1 and 2, in which no polyethylene was added, exhibited poor mold releasability. Further, Comparative Examples 3 to 5 and 7, each of which used a polyethylene having a number-average molecular weight of less than 3,000, exhibited inferior measurement stability. Moreover, Comparative Example 6, which used only trimethylolpropane montanoate, exhibited good results for the mold releasability, measurement stability and hydrolysis resistance, but underwent discoloration under high temperature. In addition, Comparative Example 8, which used a polyethylene having a number-average molecular weight exceeding 7,000, exhibited inferior mold releasability and measurement stability. Comparative Example 9, which did not use pentaerythritol tetrastearate, exhibited inferior mold releasability. Further, Comparative Example 10, which used trimethylolpropane montanoate instead of pentaerythritol tetrastearate, exhibited no problems in terms of mold releasability and measurement stability, but underwent discoloration under high temperature.

Furthermore, Comparative Example 11, which used glycerol tristearate instead of pentaerythritol tetrastearate, exhibited inferior mold releasability and measurement stability.

The above measurement results indicate that the PBT resin composition of the present invention is excellent in all of mold releasability, measurement stability and hydrolysis resistance.

The invention claimed is:

1. A polybutylene terephthalate resin composition comprising: (A) a polybutylene terephthalate resin, (B) a higher fatty acid ester of pentaerythritol, and (C) a low-molecular weight polyethylene having a number-average molecular weight of 4,500 to 5,500, wherein the polybutylene terephthalate resin composition comprising 0.2 to 1.0 parts by mass of the component (B) and 0.5 to 2.0 parts by mass of the component (C) per 100 parts by mass of the component (A).

2. The polybutylene terephthalate resin composition according to claim 1, wherein the component (B) is a stearate ester of pentaerythritol.

3. The polybutylene terephthalate resin composition according to claim 1, wherein the component (B) is pentaerythritol tetrastearate.

4. The polybutylene terephthalate resin composition according to claim 1, wherein the component (C) is a linear polyethylene.

5. The polybutylene terephthalate resin composition according to claim 1, comprising 0.2 to 0.5 parts by mass of the component (B) per 100 parts by mass of the component (A).

* * * * *